United States Patent [19]

Kensrue

[11] 4,360,141

[45] Nov. 23, 1982

[54] HOLDER FOR WELDING SEAM BACK-UP TAPE

[76] Inventor: Milo M. Kensrue, 601 Lido Park Dr. 8B, Newport Beach, Calif. 92663

[21] Appl. No.: 183,115

[22] Filed: Sep. 2, 1980

[51] Int. Cl.³ .............................................. B23K 37/06
[52] U.S. Cl. ...................................... 228/46; 165/47; 165/76; 165/170; 219/160; 228/50
[58] Field of Search .......................... 228/46, 50, 222; 219/160; 165/47, 76, 170

[56] References Cited

U.S. PATENT DOCUMENTS

| | | | |
|---|---|---|---|
| 2,280,150 | 4/1942 | Hasse et al. | 228/222 |
| 2,362,505 | 11/1944 | Smith | 219/160 X |
| 3,319,044 | 5/1967 | Dick | 228/50 X |
| 3,463,526 | 8/1969 | Benincasa et al. | 228/222 X |
| 4,295,593 | 10/1981 | Kensrue | 228/50 |

FOREIGN PATENT DOCUMENTS 619317 8/1978 U.S.S.R. ................................ 228/46

*Primary Examiner*—Kenneth J. Ramsey
*Attorney, Agent, or Firm*—Whann & McManigal

[57] ABSTRACT

A welding seam back-up structure for mounting on the backside of the adjacently positioned edge margins of work members or workpieces that are to be joined by a weld seam, in which an elongate back-up tape of fiberglass or other suitable material is retained in a position bridging the backside of the edges to be joined, by means of an extrusion back-up tape holding structure having high heat conductivity characteristics and in one form is fabricated with at least one surface recess for receiving the back-up tape, the recess having a central longitudinal generally arcuate groove for conforming the backside weld bead, and longitudinally extending heat radiating fins. In another form, the extrusion is provided with a cover which coacts with the fins to provide a flow passage for a coolant fluid. In another arrangement the extrusion is reversible and has back-up tape receiving recesses on opposite sides. In still another arrangement the extrusion is tubular and formed with an internal flow passage for a coolant fluid and has both internal and external heat radiating fins. The tape holding structure is releasably attachable to the workpieces by means of magnetic holding brackets.

15 Claims, 6 Drawing Figures

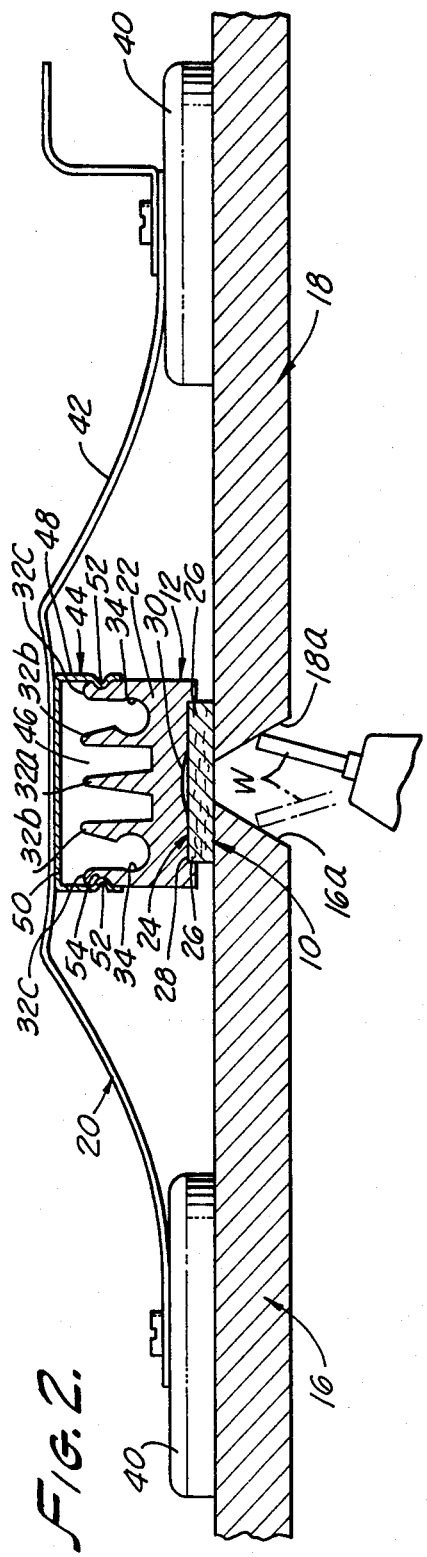
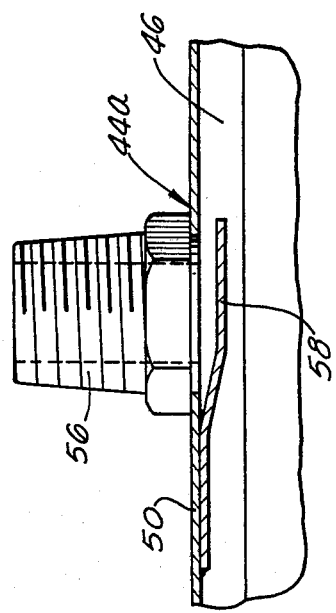
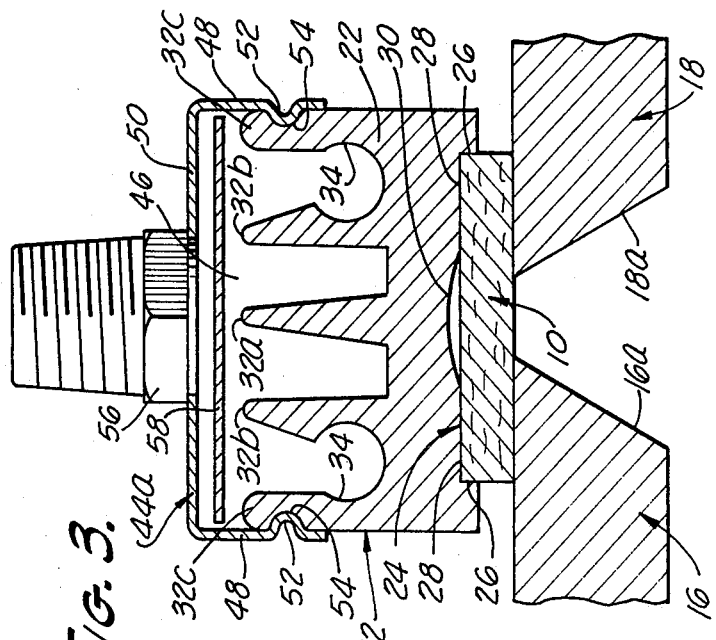
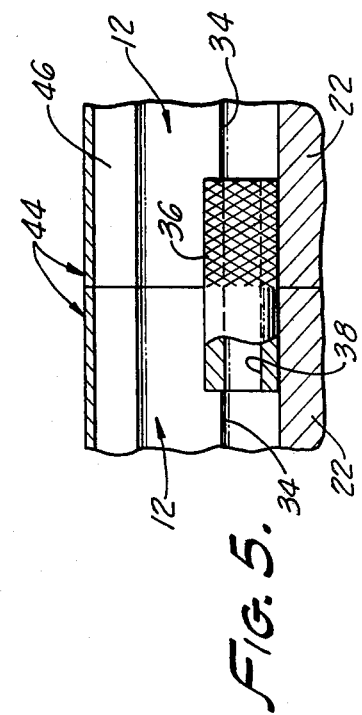

HOLDER FOR WELDING SEAM BACK-UP TAPE

BACKGROUND OF THE INVENTION

The present invention relates generally to the art of welding.

It has heretofore been generally known to utilize back-up tapes of either a relatively thick ceramic material or a flexible fiberglass tape material for the making of one-side welds and root pass back-up of two-side welds in connection with inert gas welding (TIG or MIG). In the known arrangements, provision is usually made for securing the back-up tape in bridging relation over the adjacently spaced edges of the workpieces that are to be welded along a seam line.

In some of the known embodiments, the back-up fiberglass tape or ceramic sections are secured to an aluminum foil backing which has marginal lateral edge portions that extend beyond the respective adjacent edges of the back-up material and are coated with a pressure sensitive adhesive covered with a removable liner. A roller or other means is generally used in this type of arrangement to obtain a good adhesion of the foil edges to the surface of the associated workpieces.

In another known embodiment, a granular back-up flux is molded and mounted on a flexible adhesive tape.

In use, it has been found that the use of an adhesive entails certain time consuming preparation of the workpiece surfaces in order to assure that such surfaces are properly cleaned. If the tape adhesive engages with a dirty surface, it will not effectively adhere to the workpiece, and the back-up strip will not be held in a proper position in relation to the welding seam. For this reason, it will be appreciated that although the ceramic or fiberglass back-up tape, as described above, might not be damaged in the welding operation and might be in itself reusable, the contamination of the adhesive surface of the foil would prevent reuse of the mounting foil with the back-up tape as a composite assembly. Thus, the known arrangement as just described entails a rather costly procedure, particularly in those cases in which a large number of welds are to be made as a part of a production schedule.

Attempts have therefore been made to provide an arrangement which would overcome the disadvantages of the above mentioned procedure, and for such purpose it has heretofore been proposed to utilize a rather cumbersome and complicated clamping bracket which could be magnetically attached to the surfaces of the workpieces to be welded. In one known bracket structure, the bracket includes an adjustable screw means which is carried by the bracket and is manually operable to mechanically forcibly hold one or more channel shaped holders in an operative position over the weld line, each holder being adapted to hold a plurality of ceramic back-up sections in pressure engagement over the adjacent edges of the workpiece along the seam line. While these clamping brackets and holders are reusable, and in this respect are an improvement over the use of an adhesive foil backing, the complexity and construction of the clamping brackets makes them relatively more expensive.

Tests conducted by applicant have indicated that the known concepts and devices do not embody all that could be desired for the most efficacious production of one-side welds. For example, in order to most effectively utilize the less expensive fiberglass tapes, it is an important consideration that the tape back-up means should embody an effective heat sink means for conducting heat away from the tape during the welding operation, in order to limit and control the extent of tape melting and the formation of a smooth and uniform back surface of the deposited weld material. The presently used foil mounted tapes and channel shaped holders for the ceramic sections do not have the requisite high heat conducting characteristics to form a sufficiently effective heat sink to permit the use of the less expensive flexible fiberglass tapes.

In my pending application Ser. No. 78,339, filed Sept. 24, 1979, there is disclosed a welding seam back-up means that utilizes channel shaped holders which are designed to receive the flexible fiberglass tape lengthwise therein, and in which bars of a high heat conducting material such as copper or aluminum are interposed between the tape and the channel holder in underlying relation to the tape. Also, disclosed in the application is a simplified holding bracket in which a bowed spring mounts a magnet at each end. By placing the spring in transversely extending position of engagement with the channel shaped holder, the spring will be flexed by movement of its end magnets into engagement with adjacent surfaces of the associated workpieces in such a manner as to forcibly apply a holding pressure against the channel holders and the associated fiberglass tapes.

Although the arrangement disclosed in my pending application embodies many advantages and operating features over the prior known arrangements, the present invention proposes new design concepts which facilitate the use and application of a heat sink back-up means for a welding operation, and as such constitutes an improvement in the structure disclosed in my pending application. An important feature of the present invention resides in the use of a simplified arrangement wherein the heat sink capabilities have been greatly augmented by the use of unique extrusions for holding the back-up tape in an operative position, such extrusions having heat radiating fins and a tape holding recess for longitudinally receiving the back-up tape therein. The recess is also formed with a central longitudinal groove which coacts with the back-up tape to conform the back bead of the weld. The configuration of the extrusion in one form is fabricated, to provide, either by means of an associated cover member for the radiating fins or by means of an internal flow passage for the circulation of a cooling fluid. The extrusions may be readily cut to desirable lengths, or sections may be readily connected in end-to-end relation for use in making long welds.

SUMMARY OF THE INVENTION

The present invention is more specifically concerned with improvements and means for holding a flexible fiberglass back-up tape in an operative position on the back side of a weld seam during the making of a one-side weld.

Having in mind the inherent inadaptability of the known back-up structures for such purpose, it is one object of the present invention to provide an elongate holder for a fiberglass back-up welding tape, which embodies a highly effective heat sink extrusion for conducting heat away from the back-up tape during a welding operation.

It is a further object to provide in a weld back-up tape arrangement, an elongate tape holder in the form of an extrusion of a high heat conducting material having an elongate recess to longitudinally seatingly receive a flexible fiberglass back-up tape therein, and in which said recess has a longitudinally extending groove for coacting with the tape to conform the back bead of the weld.

A further object resides in the provision of a weld back-up tape holder in the form of an elongate extrusion prefabricated from a material having high heat conducting characteristics, and in which the extrusion may be cut to selective lengths, or in the case of relatively long welds may comprise sections of the extrusion which are connected in end-to-end relation by means of connection pin members.

A further object is to provide an extrusion heat sink holder for a weld back-up tape having heat radiating fins, which may be utilized with an attachable fin cover to effect a flow passage longitudinally of the fins for a coolant fluid.

A still further object is to provide a back-up tape holder according to the previous object, in which the cover has a snap-on connection with the extrusions, and a supply connection for the coolant fluid is provided in a removable portion of the cover.

Another object is to provide a reversible heat sink extrusion for holding a weld back-up tape in an operative position, said extrusion having tape receiving recesses on opposed surface faces of the extrusion, and heat radiating fins extending longitudinally of other surface faces.

Still another object is to provide a heat sink extrusion structure for holding a weld back-up tape, in which the extrusion is fabricated to provide a longitudinally extending internal flow passage for the circulation of a coolant fluid, and wherein internally formed heat radiating external fins are provided on an outer surface of the extrusion and internal fins are provided in the interior of the flow passage.

Further objects and advantages of the invention will be brought out in the following part of the specification, wherein detailed description is for the purpose of fully disclosing preferred and modified embodiments of the invention without placing limitations thereon.

BRIEF DESCRIPTION OF THE DRAWINGS

Referring to the accompanying drawings, which are for illustrative purposes only:

FIG. 2 is an enlarged fragmentary transverse section taken substantially on line 2—2 of FIG. 1;

FIG. 3 is an enlarged fragmentary transverse sectional view showing the extrusion fin arrangement and associated cover, taken substantially on line 3—3 of FIG. 1;

FIG. 4 is a fragmentary sectional view showing details of the cover inlet connection for coolant fluid, taken substantially one line 4—4 of FIG. 1;

FIG. 5 is an enlarged fragmentary sectional view showing the connector pins for connecting extrusion sections in end-to-end relation.

DESCRIPTION OF PREFERRED AND MODIFIED EMBODIMENTS

Figure 1:
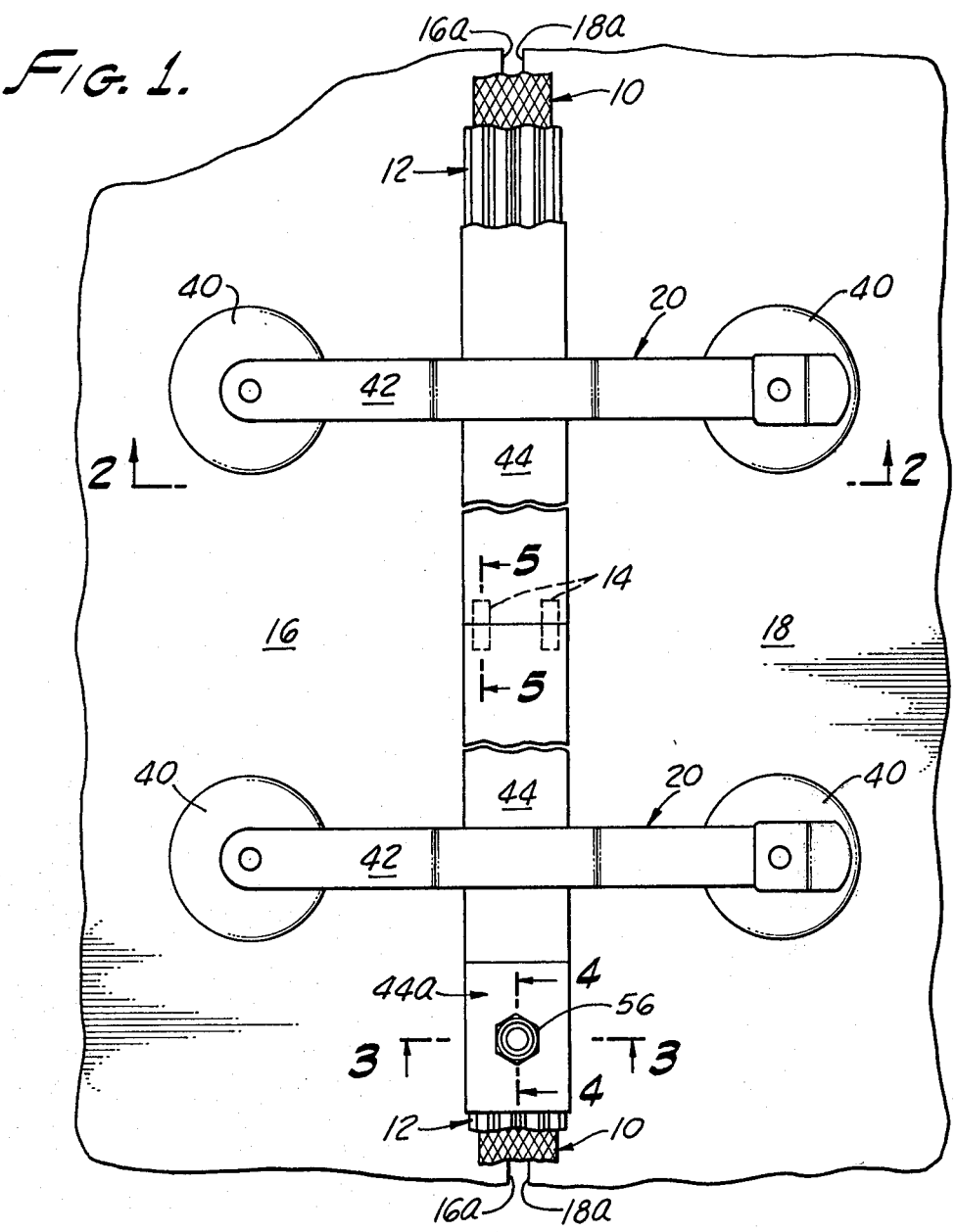
FIG. 1 is a fragmentary plan view showing welding seam back-up means according to the present invention, as applied to the edge margins of workpieces that are to be joined by a weld seam.

Referring more specifically to the drawings, for illustrative purposes, the invention is shown in FIG. 1 as comprising generally an elongate continuous back-up tape 10 of fiberglass or other appropriate material, one or more tape holding back-up extrusions 12 which are shown as being interconnected in end-to-end relation by connecting pins 14, and as being retained in an operative position with respect to a weld seam line between the adjacently disposed edges 16a and 18a of generally plate-like workpieces 16 and 18, respectively. The interconnected holding back-up extrusions 12 are retained in operative position with respect to the seam line by means of magnetically attachable holding brackets, as generally indicated in each case by the numeral 20.

As shown in FIG. 2, the edges 16a and 18a of the workpieces may be beveled to provide a generally v-shaped groove with a wide opening at the front surface of the workpieces and a relatively narrow opening on the back surface of the workpieces for receiving the melted welding material, as an electrode welding wire W is transversely oscillated in the groove. As will be seen, the back-up tape 10 is longitudinally centrally aligned with the welding groove, and as thus positioned enables the efficacious production of one-side wells and the root pass back-up of two-side welds in the conventional inert gas welding processes as conventionally known in the industry.

As best shown in FIGS. 1 and 2, the back-up extrusion 12, in its most simplified form, comprises an elongate body structure 22 of substantially uniform transverse configuration throughout its length, which is fabricated from a suitable material having high heat conducting characteristics, such as aluminum, copper and the like.

The body structure is transversely of substantially rectangular configuration and is formed on one surface face with a longitudinally extending recess 24 in which side walls 26 respectively extend in right angle relation to planar bottom wall portions 28. The recess 24 is formed in its bottom wall with a longitudinally extending central groove 30 of generally arcuate transverse configuration. This groove coacts with the associated back-up tape 10, seated in the recess 24, during a welding operation to conform and shape the back bead of the weld.

The body 22 is formed on a side opposite the recess 24 with a plurality of longitudinally spaced apart heat radiating fins 32a, 32b and 32c. The extrusion of the configuration just described is designed to maximize the transfer of heat from the back of the back-up tape 10 to the surrounding atmosphere, which is augmented by the heavy cross section of the pins and by the use of a black anodized finish. Moreover, the recess 24 is rather shallow and seats the back-up tape therein without the body 22 of the extrusion coming in direct contact with the adjacent workpieces. Due to the spacing between the fins, this spacing exposes large surfaces of the fins to the ambient cooling medium. The bottom portions of the channels, which separate the fins 32b and 32c at each side of the extrusion body 22, are formed with an arcuate or partially cylindrical wall portion 34 which serves at the ends of the extrusion to receive the ends of connecting pins 36 (FIG. 5) and thus permit the interconnection of extrusion sections in end-to-end relation. The pin 36 may be knurled at one end so as to be fixedly anchored to one of the connected sections, while the other end of the pin may have a smooth outer surface to facilitate a slip connection with the adjacent cylindrical portion 34 of the other connected section. In some arrangements, the pin 36 may be solid, while in other installations it may be found desirable to provide a tubular pin with a longitudinally extending bore 38 for the purpose of providing a flow connection between the associated channels of connected extrusion sections.

In some types of welding, the use of the back-up extrusion will in itself provide the necessary cooling through radiation directly into the ambient atmosphere. In such case, the holding brackets 20 will be utilized for direct engagement with the extrusion. When so used, the magnetic pads 40 are positioned on opposite sides of the extrusion, in the manner shown in FIGS. 1 and 2, and a connecting spring 42 positioned in engagement with the outer extremities of the heat radiating fins, rather than in engagement with a fin cover closure 44 which may be utilized with the extrusion 12 so as to coact and form with the channels between the fins a longitudinal extending flow passage 46 for the circulation of an appropriate coolant fluid in a manner to increase the heat sink capabilities under certain types of welding operations.

As best shown in FIGS. 1-3, the fin cover 44 is transversely of a substantially rectangular channel configuration, and is formed with lateral side walls 48 which extend in right angled relation, respectively, from a bridging connecting wall 50.

The cover 44 is releasably attached to the back-up extrusion 12 by a snap-on connection in the form of a longitudinally extending bead 52 along each side wall 48, respectively, this bead being adapted to seat within a longitudinally extending groove 54 formed on each of the fins 32c respectively. This type of cover connection is such that, if desired, the cover may be utilized as a connecting means for securing the adjacent ends of extrusion sections together, either in lieu of the pins 36, or as an addition to the pins 36.

Provision is made for supplying a coolant fluid to the flow passage 46 by means of a connection nipple 56 which may be mounted in the bridging wall 50 of the cover 44. Preferably, however, the nipple is mounted on a removable cover section 44a. The coolant fluid entering the covered extrusion from the nipple 56 is deflected by an internal deflector 58 in a direction of flow which is generally axially of the flow passage 46. The deflector 58 is shown as being connected to the associated wall 50.

Figure 6:
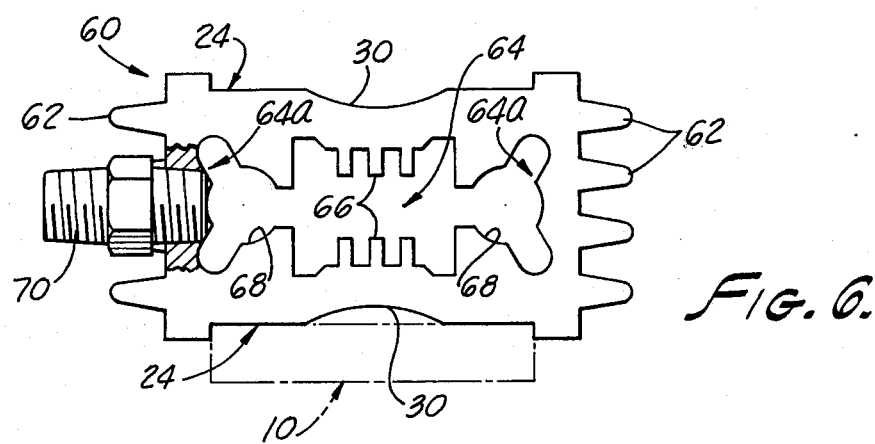
FIG. 6 is an end view of a modified reversable extrusion with an internal flow passage, and internal and external heat radiating fins.

A modified extrusion configuration is disclosed in FIG. 6 which has the advantages of reversability, and can be utilized with or without a coolant fluid. This extrusion, as generally indicated by the numeral 60, is similarly fabricated from a material having high heat conductivity characteristics, and has a substantially uniform transverse configuration. As will be seen, the modified extrusion 60 is of tubular construction and is generally of a rectangular configuration.

Opposite surface faces are similarly provided with longitudinally extending recesses 24 for the selective reception of a back-up tape 10, as indicated in phantom lines. As in the case of the previously described extrusion 12, each of the recesses 24 is provided with a longitudinally extending arcuate central groove 30. The other opposite surface faces of the extrusion are provided with longitudinally extending radiating fins 62 which have heat exchange surfaces engaged with the surrounding ambient atmosphere.

The heat sink capability of this extrusion form is increased by the provision of a main longitudinally extending internal flow passage 64 which is also of generally rectangular configuration. The internal walls of this passage which are adjacent to the central grooves 30 are formed with inwardly extending longitudinal fins 66 which have heat exchange surfaces engaged by coolant fluid which may be supplied to the flow passage 64.

Lateral auxiliary flow passages 64a, are respectively provided adjacent the extrusion surface faces containing the fins 62, these auxiliary passages being connected to the main flow passage 64. Each of the auxiliary flow passages 64a is formed with partially cylindrical wall portions, as indicated at 68, which are utilized for the reception of the ends of a connecting pin 36 in a manner previously described for connecting the adjacent ends of extrusion sections in end-to-end relation. In this form of the extrusion, a connection nipple 70, which is mounted in one of the fin containing walls, provides for connection of passages 64 and 64a with a supply source of an appropriate coolant fluid.

From the foregoing description and drawings, it will be clearly evident that the delineated objects and features of the invention will be accomplished.

Various modifications may suggest themselves to those skilled in the art, without departing from the spirit of my invention, and, hence, I do not wish to be restricted to the specific forms as shown, or uses as mentioned, except to the extent indicated in the appended claims.

I claim:

1. As an article of manufacture, an elongate extrusion of a relatively high heat conducting metallic material for use in holding a welding seam back-up tape during a welding operation, comprising:
    an elongate body of generally uniform transverse configuration;
    a longitudinally extending surface recess for the reception of said back-up tape formed respectively in opposite wall surface faces of said body, each of said recesses having a longitudinally extending bottom central groove of generally arcuate transverse configuration; and
    a plurality of longitudinally extending external heat radiating fins formed on opposite wall side surface faces of said body, said side faces being generally in right angle relation to the faces containing said recesses.

2. An extrusion according to claim 1, in which:
    the body walls surround a common internal longitudinally extending flow passage for a coolant fluid.

3. An extrusion according to claim 2, in which:
    internal longitudinally extending heat radiating fins are formed on the walls of said flow passage containing said recesses.

4. A welding seam back-up means for mounting on the back side of the adjacently positioned edge margins of members to be joined by a weld seam, comprising:
    a. an elongate tape of flexible material adapted to be positioned in straddling relation over the adjacent edge margins and extending longitudinally therealong;
    b. tape holding means adapted to be positioned over said tape, comprising:
        an elongate extrusion member of a material having relatively high heat conducting characteristics;

said extrusion having a longitudinally extending surface recess formed on at least one face of the extrusion for seatingly receiving the tape therein and longitudinally extending heat radiating fins formed on a surface opposite the surface face on which said recess is formed, said fins being laterally spaced apart to provide a plurality of longitudinally extending open channels;

c. elongate cover means positioned over said fins and coacting therewith to form a longitudinally extending flow passage for a coolant fluid;

d. an inlet connection with said flow passage mounted on said cover means, comprising:
a nipple adapted for connection with a source at coolant fluid; deflecting means within said flow passage for directing inlet fluid from the nipple in a direction longitudinally along the extrusion within said flow passage; and e. means for releasably securing said tape holding means and applying pressure in a direction to force the tape in said recess against the adjacent edge margins.

5. A welding seam back-up means for mounting on the back side of the adjacently positioned edge margins of members to be joined by a weld seam, comprising:

a. an elongate tape of flexible material adapted to be positioned in straddling relation over the adjacent edge margins and extending longitudinally therealong;

b. tape holding means adapted to be positioned over said tape; comprising:
an elongate extrusion member of a material having relatively high heat conducting characteristics;
said extrusion having longitudinally extending surface recess formed on at least one face of the extrusion for seatingly receiving the tape therein, and a second similar surface recess upon an opposite face thereof, whereby to enable the holding means to be selectively reversibly applied to said tape; and c. means for releasably securing said tape holding means and applying pressure in a direction to force the tape in said recess against the adjacent edge margins.

6. Welding seam back-up means according to claim 5, in which:
said channels respectively at the opposite sides of the extrusion are formed with open end portions conformed for the endwise reception of an end of a tubular pin for connecting contiguous ends of said extrusions in end-to-end relation and providing a flow passage between the connected channels.

7. Welding seam back-up means according to claim 4, in which:
said cover means has a snap-on connection with said extrusion.

8. Welding seam back-up means according to claim 7, in which:
said cover means comprises an elongate channel member having side walls adapted to overlap side walls respectively of said extrusion member; and
said snap-on connection comprises a longitudinally extending elongate groove and elongate bead for interfittingly releasably interconnecting each of the overlapped side walls.

9. Welding seam back-up means according to claim 4, in which:
said inlet connection is mounted upon a removable section of said cover means.

10. Welding seam back-up means according to claim 4, in which:
said nipple and said deflecting means are mounted on a removable section of said cover means.

11. Welding seam back-up means according to claim 5, in which:
heat radiating fins are formed on another face of the extrusion.

12. Welding seam back-up means according to claim 5, in which:
the extrusion is of generally rectangular transverse configuration; and
external longitudinally extending heat radiating fins are formed on opposite faces of the extrusion, and which are in substantially right angle relation to the faces having the recesses formed therein.

13. Welding seam back-up means according to claim 5, in which:
said tape holding means is formed to provide an internal longitudinally extending flow passage for the circulation of a coolant fluid.

14. Welding seam back-up means according to claim 13, in which:
external heat radiating fins are formed on an external surface of said extrusion; and
internal fins are formed on a wall of said flow passage.

15. Welding seam back-up means according to claim 13, in which:
the opposite end faces of the extrusion includes a pair of laterally spaced end openings respectively adapted to receive endwise therein an end of a connection pin, whereby extrusion sections may be connected in end-to-end relation.

* * * * *